(12) United States Patent
Tseng et al.

(10) Patent No.: US 11,663,367 B1
(45) Date of Patent: May 30, 2023

(54) DISPLAY MANAGED PRIVACY MODE TO PRESENT INFORMATION HANDLING SYSTEM VISUAL IMAGES

(71) Applicant: Dell Products L.P., Round Rock, TX (US)

(72) Inventors: Kuo-Wei Tseng, Zhongzheng District (TW); Yu-Chen Liu, Hsinchu (TW); Dan Odell Boice, Taipei (TW); Hong-Ji Huang, Taoyuan (TW); Chi-Fong Lee, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/681,382

(22) Filed: Feb. 25, 2022

(51) Int. Cl.
*G06F 21/84* (2013.01)
*G09G 3/34* (2006.01)

(52) U.S. Cl.
CPC .......... *G06F 21/84* (2013.01); *G09G 3/3406* (2013.01); *G09G 2310/08* (2013.01); *G09G 2320/064* (2013.01); *G09G 2320/08* (2013.01); *G09G 2358/00* (2013.01)

(58) Field of Classification Search
CPC .................................................. G09G 3/3406
See application file for complete search history.

(56) References Cited

U.S. PATENT DOCUMENTS

| 8,362,981 | B2 | 1/2013 | Mizukoshi et al. |
| 8,830,221 | B2 | 9/2014 | Yeh et al. |
| 10,181,306 | B2 | 1/2019 | Chang et al. |
| 11,067,736 | B2 | 7/2021 | Robinson et al. |
| 2015/0378085 | A1* | 12/2015 | Robinson ............... H04N 13/32 359/464 |
| 2017/0329399 | A1* | 11/2017 | Azam ..................... G06F 3/017 |

* cited by examiner

*Primary Examiner* — Gustavo Polo
(74) *Attorney, Agent, or Firm* — Zagorin Cave LLP; Robert W. Holland

(57) ABSTRACT

An information handling display presents visual images in a privacy mode that manages visual image brightness with a local processing resource when a predetermined condition is detected, such as multiple individuals in the display field of view. For example, an information handling system provides visual information to a display timing controller that includes a pulse width modulation signal to command display backlight brightness. When in a privacy mode, the timing controller or another processing resource modifies the pulse width modulation signal to command a predetermined reduced brightness, such as in a range of 30 to 50 nits of reduced brightness.

17 Claims, 5 Drawing Sheets

DISPLAY MANAGED PRIVACY MODE TO PRESENT INFORMATION HANDLING SYSTEM VISUAL IMAGES

BACKGROUND OF THE INVENTION

Field of the Invention

The present invention relates in general to the field of information handling system security, and more particularly to a display managed privacy mode to present information handling system visual images.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information to generate output for presentation to an end user at a display. The presentation of information may be performed at an integrated display, such as is typically included in the housing of a portable information handling system, or at a peripheral display that is separate from the housing of the information handling system. Generally, visual images for presentation at a display are defined with pixel values by a graphic processing unit of the information handling system and communicated to the display through a display cable. A timing controller of the display scans the pixel values to an array of pixels that present a color defined by the pixel so that the composite of pixels generates a visual image. The information handling system operating system typically has a display driver that defines communication protocols for the pixel values and display operating constraints, like brightness, contrast and color temperature. Typically, the information handling system Basic Input/Output System (BIOS) manages physical system interactions with a display in cooperating with the driver. For example, a change in brightness setting at a display is managed by having the BIOS set a pulse width modulation (PWM) duty signal to adjust the amount of illumination output at a display backlight, such as the brightness of illumination from a backlight's light emitting diodes (LEDs).

One difficulty with presentation of visual images at a display is that people other than the end user can view the visual images. Often visual images presented at a display include private information that an end user does not want to have viewed by others. A variety of techniques are available to help limit undesired viewing of display images, such as polarizers that fit over a display panel to restrict viewing angles for the display so that an end user can see visual images when normal to the display panel while others with off-angle views have difficulty seeing the visual images. Tools such as this that restrict viewing angles can prove inconvenient for end users who have a more narrow range of viewing angles for viewing the display. An alternative approach is to monitor the viewing area of the display, such as with a camera or time of flight sensor, and reduce the brightness of the display when a person other than the end user is in a viewing position relative to the display. As an example, the sensor provides an embedded controller with an indication of an unauthorized viewer so that the BIOS can command a reduced brightness at the display, such as by commanding a reduced PWM signal that defines display backlight illumination brightness. For instance, the PWM defined for presentation of the visual images is by a percentage amount across the range of brightness settings available for the display. One disadvantage to this approach is that a maximum brightness available in the privacy mode is limited to the privacy percentage below the display's maximum brightness. Another disadvantage of this approach is that the coordination of brightness from the information handling system can result in a slow response, increased complexity and difficulties where software versions become incompatible due to inconsistent updates or other factors.

SUMMARY OF THE INVENTION

Therefore, a need has arisen for a system and method which efficiently manages a privacy mode presentation at a display.

In accordance with the present invention, a system and method are provided which substantially reduce the disadvantages and problems associated with previous methods and systems for applying a privacy mode at a display by reducing display brightness. A processing resource in a display, such as a timing controller or extra MCU, modifies brightness commanded from an information handling system when a privacy mode is selected to achieve a predetermined brightness reduction at the display.

More specifically, an information handling system processes information to generate visual images for presentation at a display. For example, a central processing unit (CPU) cooperates with a random access memory (RAM) to execute instructions of an operating system and applications that define visual information, which a graphics processing unit (GPU) further processes to generate pixel values that define a visual image at a display panel, such as a liquid crystal display (LCD) panel. The information handling system provides brightness information to the display, such as with a pulse width modulation signal duty cycle, and a privacy mode indication, such as a GPIO signal that commands a privacy mode when an unauthorized individual is detected in field of view of the display. When the privacy mode is commanded from the information handling system to the display, a processing resource of the display modifies the brightness information provided to the display to reduce brightness commanded from a backlight of the display and forwards the modified brightness information to a LED driver integrated circuit that drives the backlight. For example, when privacy mode is commanded to a display, pulse width modulation signal duty cycle is modified by a timing controller of the display to achieve a 20 to 30 nit brightness decrease and the modified pulse width modulation signal is provided to the LED driver integrated circuit. When a share mode is commanded by the information handling system, the timing controller forwards the pulse width modulation signal unmodified to the LED driver integrated circuit.

The present invention provides a number of important technical advantages. One example of an important technical advantage is that a privacy mode is supported at an information handling system to reduce displayed visual image brightness by modifying brightness of the display with logic executing on the display. Execution of privacy mode display brightness modification logic at a display processing resource supports the display presenting visual images with a full range of available brightness settings. For example, when display brightness is automatically adjusted for ambient conditions, an end user can reach the same brightness that is available in the sharing mode when working in a high ambient light environment, such as outdoors, and also enjoy further lower brightness when working in an indoor environment for a privacy application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display privacy mode is performed by modification at the display of pulse width modulation brightness commands communicated from an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
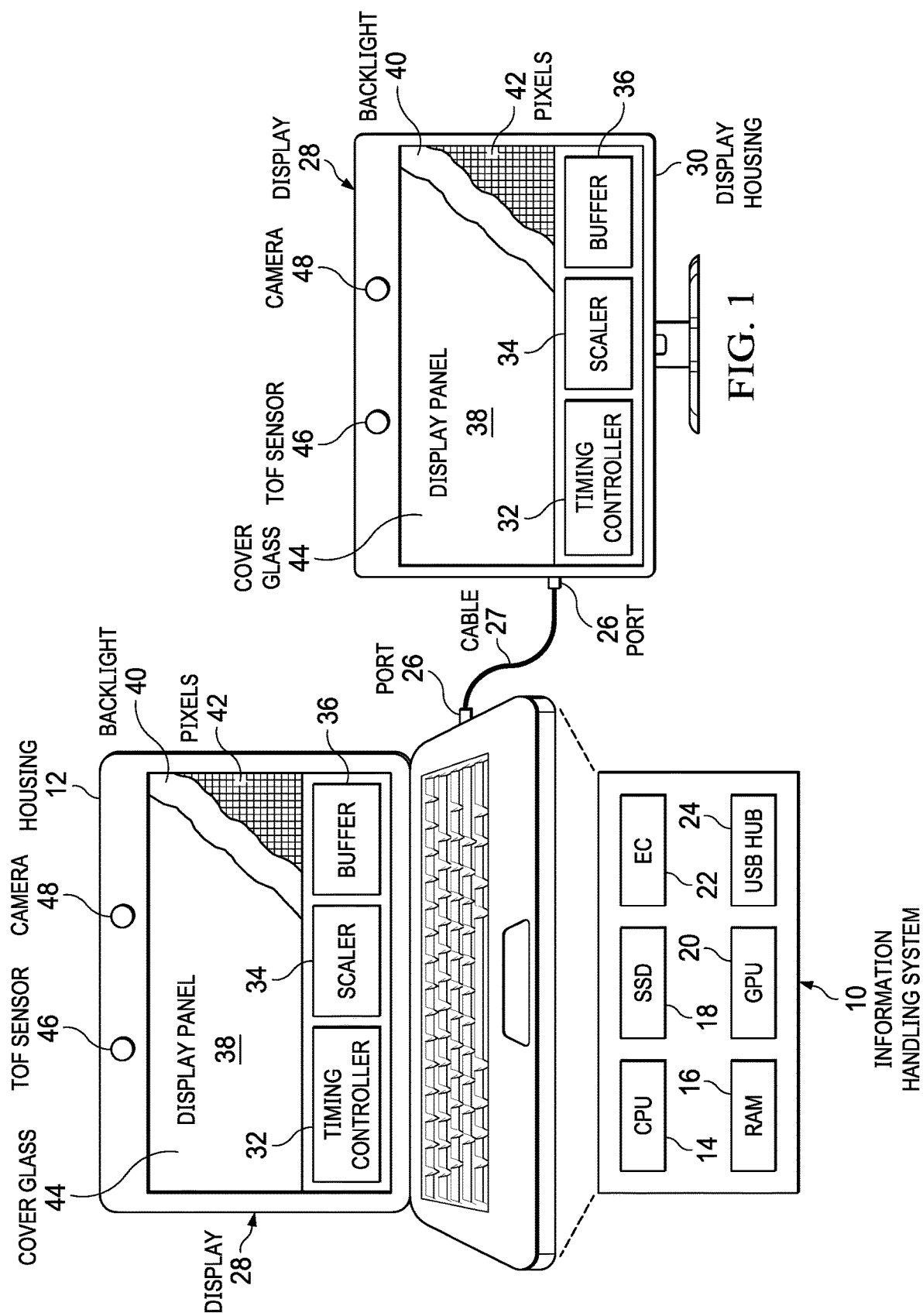
FIG. 1 depicts a block diagram of an information handling system that presents visual images at a display having a privacy mode supported by logic at the display to reduce displayed visual image brightness.

Referring now to FIG. 1, a block diagram depicts an information handling system 10 that presents visual images at a display 28 having a privacy mode supported by logic at the display to reduce displayed visual image brightness. In the example embodiment, information handling system 10 is built with processing components included in a portable housing 12, although alternative embodiments may have a stationary housing configuration. Information handling system 10 processes information by executing instructions on a central processing unit (CPU) 14 in cooperation with a random access memory (RAM) 16 that stores the instructions and information. A solid state drive (SSD) 18 provides persistent storage of information, including an operating system and applications that include instructions to execute on CPU 14. A graphics processing unit (GPU) 20 interfaces with CPU 14 to further process information and define visual images for presentation at a display 28, such as by defining pixel values that set pixel colors. In the example embodiment, images are presented at both a first display 28 integrated in the portable housing and at a peripheral display 28 separate from the portable housing. An embedded controller 22 manages physical system operation at information handling system 10, such as application of power, managing thermal constraints and interacting with peripheral devices. A USB hub 24 interfaces with CPU 14 to support peripheral communications through a USB interface, such as a Type-C USB port 26. In alternative embodiments, other types of communication interfaces may be used, such as DisplayPort and HDMI port.

Information handling system 10 provides visual image information to the integrated display 28 with an internal bus or peripheral display 28 with a cable 27 disposed between ports 26, such as a Type-C USB, DisplayPort or HDMI cable. Visual image information includes pixel values that define a color for each pixel 42 of display panel 38 to present and a pulse width modulation signal that commands a brightness of a backlight 40 to illuminate behind display panel 38, such as with white light that passes through liquid crystal display (LCD) pixels. The pixel values and pulse width modulation signal are provided to a timing controller 32, which scans the pixel values to the pixels 42 and passes the brightness to a drive integrated circuit of backlight 40. A scalar 34 provides a processing resource for display 28 to execute logic and adjusts pixel values when necessary to present visual images with an appropriate resolution. A display buffer 36 provides a memory resource that stores pixel values and can include display operational information. With respect of display 28 having the peripheral configuration, a display housing 30 separate from information handling system 10 supports display panel 38 disposed under a cover glass 44. Although the example embodiment has visual information communicated to the peripheral display through a cable 27, in alternative embodiments visual images may instead be communicated with wireless signals or, in the case of the portable information handling system integrated display, by an internal link, such as a PCIe link.

As is described below in greater detail, both the peripheral and integrated display configurations offer a privacy mode enforced by a decrease in brightness to make viewing of visual images off the normal axis more difficult.

Display 28 sometimes presents visual images that an end user may not want other individuals to view. To help maintain privacy of displayed visual images, display 28 may present the visual images with a reduced brightness so that the displayed visual images are not visible to individuals too far from a normal axis of display panel 38. As display brightness decreases, viewing of the visual images becomes more difficult the further off the normal axis to the display panel that an individual lies. As an example, an end user may initiate a privacy mode by hitting a hotkey, or the privacy mode may be automatically initiated when an unauthorized individual is detected, such as by a camera 48 or time of flight sensor 46. When a sensor of the information handling system or display detects an unauthorized individual in a viewing position of the visual images, a privacy mode is commanded that reduces the brightness of the visual image and makes the information at the display panel more difficult to read. In the example embodiment, a time of flight sensor 46 provides user presence detection with an infrared light scan that detects distance with time to receipt of the reflection, and a camera 48 detects individuals in the camera field of view with an analysis of images captured by the camera, such as facial recognition. To achieve the privacy mode, logic executing on a processing resource of display 28 modifies brightness of backlight 40 in response to a privacy mode indication, such as communicated from a user presence sensor, embedded controller 22, GPU 20 or other source. Although the example embodiment manages brightness provided from a backlight 40 and an LCD display panel 38, in alternative embodiments, other types of display panels may be used, such as organic light emitting diode (OLED) display films.

Figure 2:
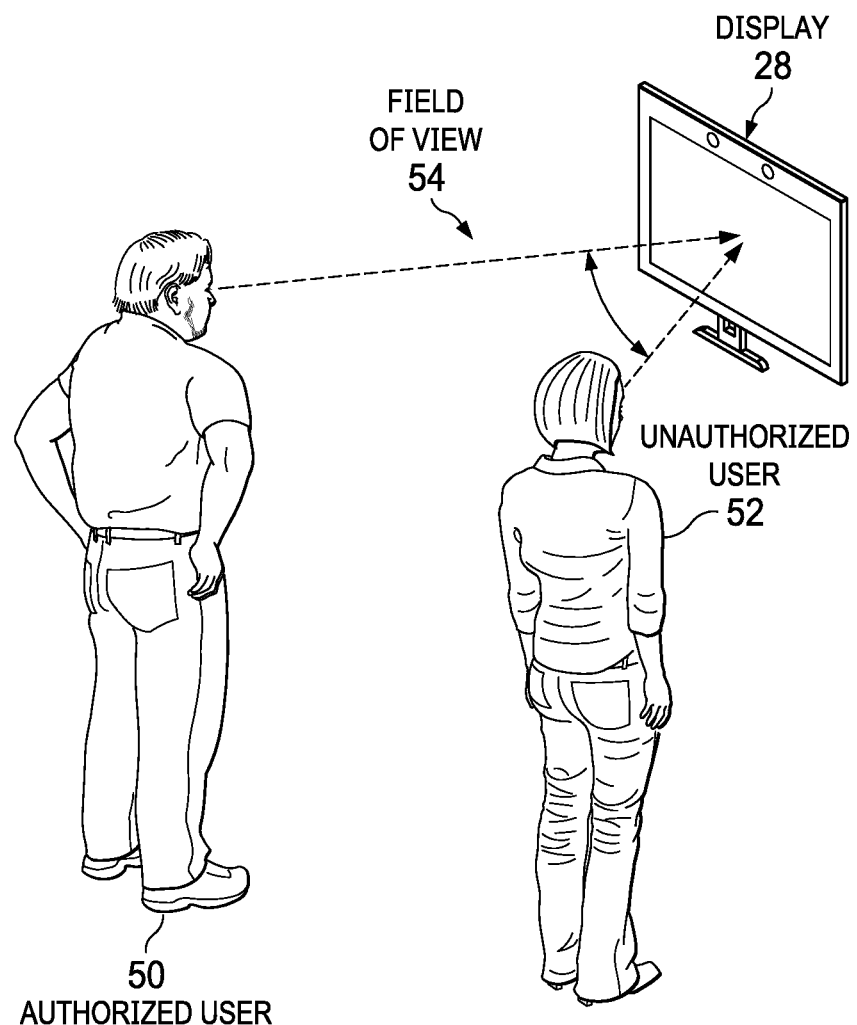
FIG. 2 depicts an example of a privacy mode that reduces brightness when multiple individuals are detected in a display field of view.

Referring now to FIG. 2, an example depicts a privacy mode that reduces brightness when multiple individuals are detected in a display 28 field of view 54. In the example embodiment, an authorized user 50 is centrally located in field of view 54 normal to the visual image presented at display 28. An unauthorized user 52 has an offset location of approximately 45 degrees relative to normal the visual image at which the visual image has a lower readability. In the example embodiment, when display 28 has an ambient light setting of 500 lux a brightness at a central location for authorized user 50 of 182.2, a 45 degree ambient contrast of 1.69 provides a readability level of 5 so that content of display 28 is readable also by unauthorized user 52. When the brightness is reduced to 151.7 at the central location, the content remains readable by authorized user 50, however, a 45 degree ambient contrast of 1.34 provides a readability level of 2 at which unauthorized user 52 has difficulty understanding the visual image content. For example, at a readability level of 2, content is difficult to read within a five second period or with an error rate of 70%. Display 28 provides the privacy mode by dimming the brightness of the visual image when an unauthorized individual is detected and the reduction in brightness should maintain readability for the authorized individual while reducing readability for the unauthorized individual. A relatively minor change in display brightness can have a significant impact on off-axis readability. For example, a reduction in brightness in a range of approximately 20 to 30 nits provides adequate readability along a normal axis while reducing readability to provide privacy for off-axis viewing. Display 28 enforces the privacy mode by setting brightness with local logic based upon an indication of an unauthorized individual in an off-axis viewing position, such as by a GPIO communicated from an information handling system to the display or from a sensor integrated in the display.

Figure 3:
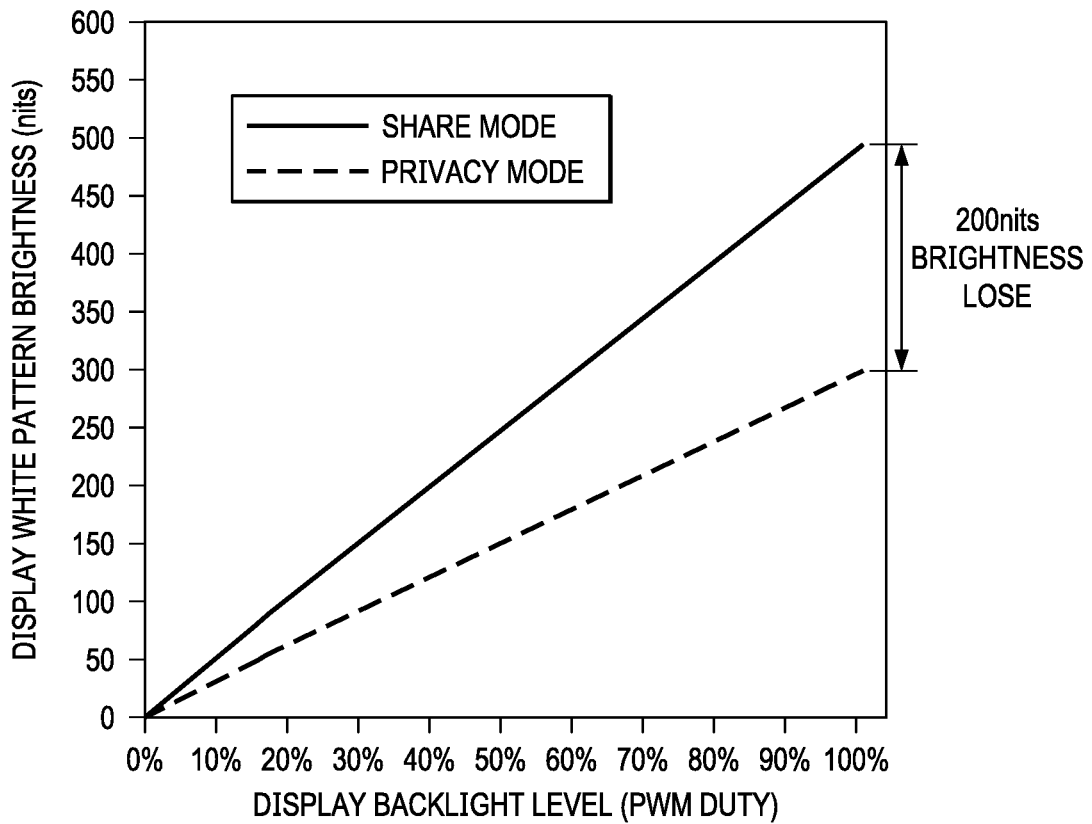
FIG. 3 depicts an example of prior art privacy mode performed by altering display brightness at an information handling system.

Referring now to FIG. 3, an example depicts a prior art privacy mode performed by altering display brightness at an information handling system. In a share mode of viewing, at total brightness of 500 nits is available, however, a privacy mode is provided by reducing a pulse width modulation duty cycle communicated from an information handling system to a display in a linear manner. As a result, when a full brightness is commanded in the privacy mode, 200 nits of reduced illumination is provided. Reducing the maximum available brightness in this manner can have an inordinate impact on readability along the normal axis, such as when ambient light conditions are bright. By controlling brightness locally at the display instead with remote pulse width modulation signals, a maximum brightness may remain available for use in bright ambient conditions where readability is reduced along the normal axis and small reductions in brightness will provide privacy for off-axis viewers.

Figure 4:
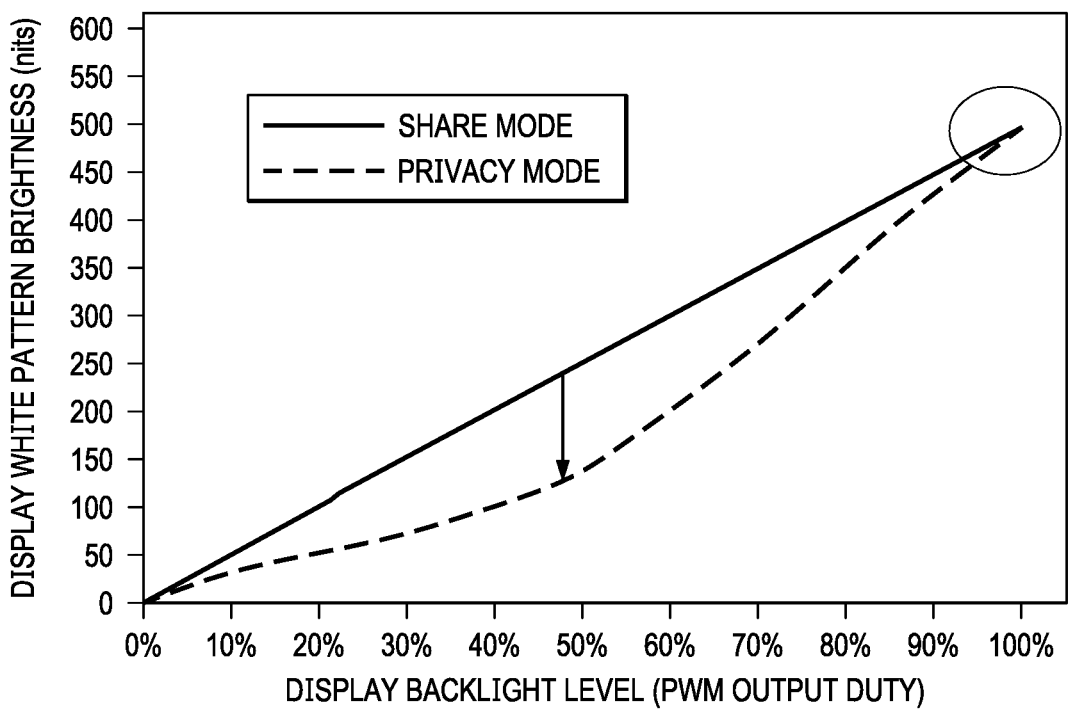
FIG. 4 depicts an example of a privacy mode performed by altering brightness communicated from an information handling system with logic at a display.

Referring now to FIG. 4, an example depicts a privacy mode performed by altering brightness communicated from an information handling system with logic at a display. The brightness in shared mode has a linear relationship to pulse width modulation duty cycle from a brightness of zero nits at zero pulse width modulation to a brightness of 500 nits at a 100% pulse width modulation duty cycle. In the privacy mode, the information handling system sends the same pulse width modulation duty cycle, however logic at the display modifies the pulse width modulation to that indicated by the privacy mode and provides the modified pulse width modulation signal to the display backlight. The modification to the pulse width modulation duty cycle is greater in the range around 50% duty cycle due to the system BIOS having a default set up at the 50% duty cycle. Modifying the pulse width modulation cycle at the display provides a more precise control over the brightness change from shared to privacy mode, such as by targeting a difference of brightness in the range of 20 to 30 nits. In alternative embodiments, the range for the brightness modification may vary based upon the ambient light conditions and, if available to the display, the amount of offset angle of the unauthorized user. For example, a variety of ranges may be used to set brightness for a privacy mode, such as between 5 and 100 nits based upon a variety of factors including ambient light settings. In another embodiment, the brightness modification may vary based upon the implementation of automated brightness adjustments at the display as ambient light changes. Non-transitory memory, such as a flash memory, may store values for brightness reductions to provide a privacy mode and associated pulse width modulation modifications to achieve the brightness reductions. In one example embodiment, the brightness modifications may include different brightness changes based upon an offset angle of an unauthorized viewer of the display.

Figure 5:
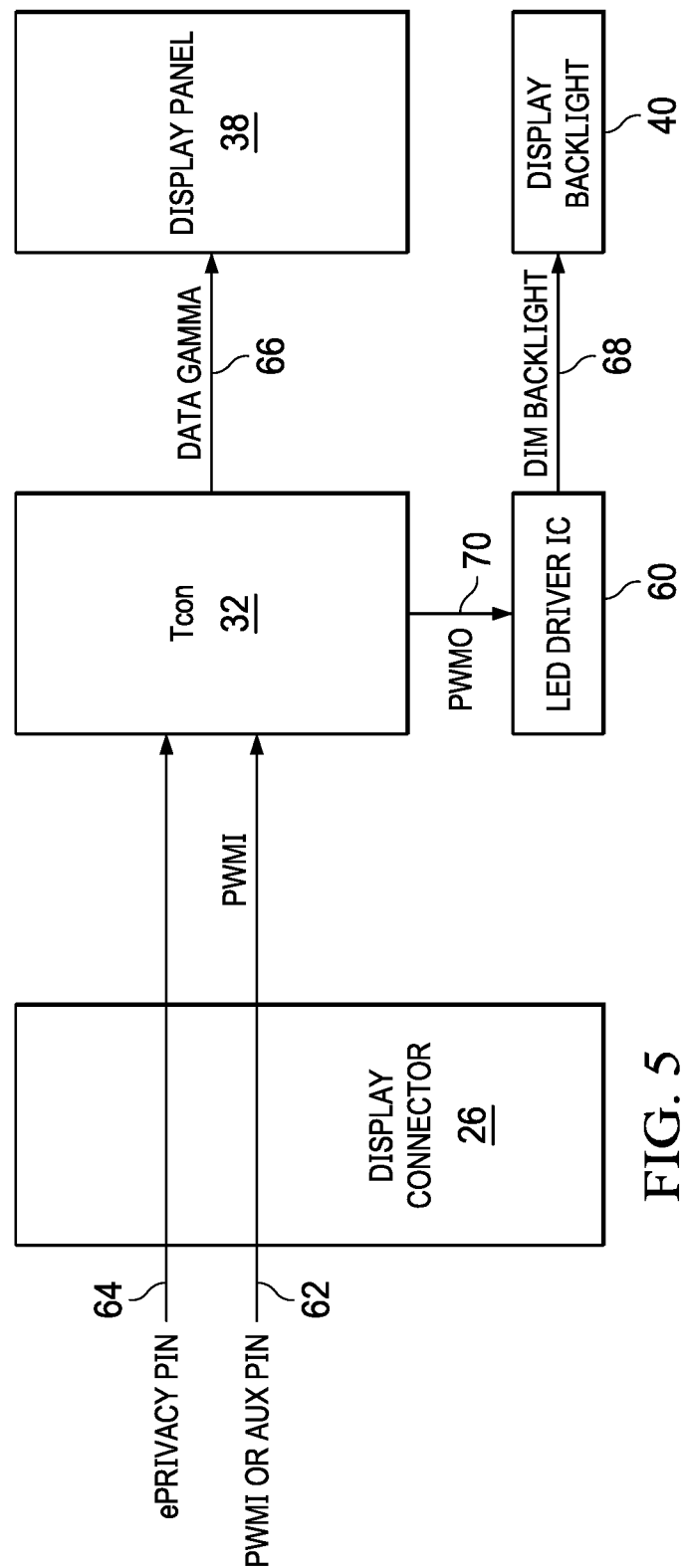
FIG. 5 depicts a block diagram of a system for modifying display brightness by modifying a pulse width modulation signal from an information handling system with a processing resource of a timing controller.

Referring now to FIG. 5, a block diagram depicts a system for modifying display brightness by modifying a pulse width modulation signal from an information handling system with a processing resource of a timing controller 32. In the example embodiment, an information handling system communicates an ePrivacy GPIO pin output 64 and a pulse width modulation (PWM) or auxiliary pin 62 through a display port 26 to a timing controller 32. The ePrivacy pin enables and disables the privacy mode and provides a high or low value when the privacy mode is enabled to command a brightness decrease, such as when an unauthorized viewer is at the display. Timing controller 32 includes a processing resource, such as an integrated microcontroller and non-transitory memory that receives the pulse width modulation signal from port 26 and passes the pulse width modulation signal to a light emitting diode (LED) driver integrated circuit 60 that sets a brightness at display backlight 40, such as dimming the backlight 68. When share mode is selected, timing controller 32 passes the pulse width modulation signal input from the information handling system unchanged to LED driver integrated circuit 60. When privacy mode is selected with the ePrivacy GPIO, the processing resource of timing controller 32 modifies the pulse width modulation input to provide a modified pulse width modulation output 70 that targets a brightness reduction of 20 to 30 nits commanded by LED driver integrated circuit 60 to display backlight 40. The pixel values scanned at gamma data 66 to display panel 38 remains unmodified in the shared and privacy modes so that the quality of the visual image presented by display panel 38 is not effected.

Figure 6:
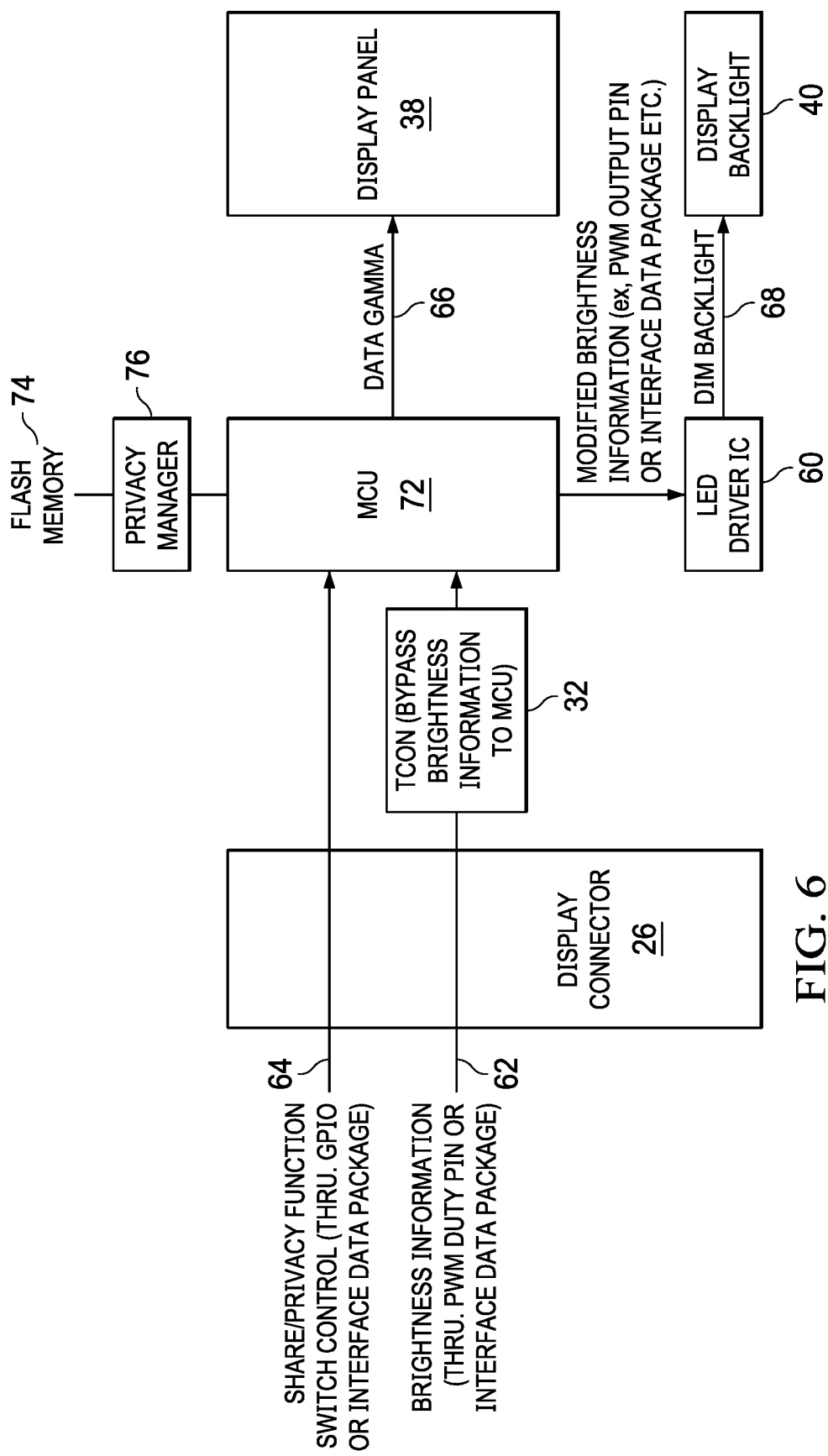
FIG. 6 depicts a block diagram of a system for modifying display brightness by modifying a pulse width modulation signal from an information handling system with a processing resource separate from a timing controller.

Referring now to FIG. 6, a block diagram depicts a system for modifying display brightness by modifying a pulse width modulation signal from an information handling system with a processing resource 72 separate from a timing controller 32. In the example embodiment, brightness information is communicated from the information handling system through port 26 to timing controller 32. The brightness information is, for example, a pulse width modulation input 62 that provides a pulse width modulation signal having a duty cycle, or may be other types of brightness interface data packages as defined by an operating system display driver. A share or privacy mode ePrivacy GPIO pin output 64 is provided to processing resource 72 to command shared or privacy mode at the display. Timing controller 32 forwards the brightness information to processing resource 72, which in turn forwards the brightness information to LED driver integrated circuit 60 to command brightness output 68 to display backlight 40. In the example embodiment, processing resource 72 is a microcontroller unit (MCU) interfaced with a flash memory 74 that stores a privacy manager 76 to execute when privacy mode is selected. Processing resource 72 receives pixel values from timing controller 32 and provides the gamma data 66 for presentation of the visual images to display panel 38 without change. When processing resource 72 has privacy mode commanded, privacy manager 76 executes to modify the brightness commanded by the information handling system, such as the brightness pulse width modulation 62 duty cycle, to a reduced brightness commanded to LED driver integrated circuit 60, such as to target 20 to 30 nits of reduced brightness. When share mode is selected, processing resource 72 provides the brightness as commanded from the information handling system to the LED driver integrated circuit 60. Although the example embodiments apply pulse width modulation from the information handling system to adjust brightness, a data package interface protocol may be used in the place of pulse width modulation output, such as the data package interface protocols in development as proposed display industry standards. In such an instance, the data package interface protocol information communicated to the display is altered by the timing controller or MCU in a manner similar to that applied to pulse width modulation adjustments. In alternative embodiments, brightness setting commands other than pulse width modulation commands and data package commands may be used.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions to process information;
   a memory interfaced with the processor and operable to store the instructions and information;
   a display interfaced with the processor and operable to present the information as visual images, the display having a processing resource; and
   a non-transitory memory interfaced with the processing resource and storing instructions that when executed on processing resource cause:
   monitoring brightness commanded to the display;
   detecting a privacy mode associated with presentation of visual images at the display; and
   in response to the detecting, modifying the brightness commanded to the display with the processing resource for application at the display;
   wherein:
   the display receives the brightness as data package commands at a timing controller;
   the timing controller provides the brightness to the processing resource to modify the data package commands; and
   the processing resource provides the modified data package commands to a backlight driver integrated circuit.

2. The information handling system of claim 1 wherein the processing resource comprises a microcontroller separate from the timing controller.

3. The information handling system of claim 1 wherein:
   the processing resource comprises a timing controller that receives the brightness as pulse width modulation commands and modifies the pulse width modulation commands; and
   the timing controller provides the modified pulse width modulation to a backlight driver integrated circuit.

4. The information handling system of claim 3 wherein the brightness pulse width modulation commands are generated by a basic input output system executed by the processor.

5. The information handling system of claim 4 wherein the basic input output system communicates the privacy mode as a command to the timing controller.

6. The information handling system of claim 2 further comprising:
   a user presence detection sensor integrated included in the display and operable to detect one or plural end users viewing the display;
   wherein detection of plural end users viewing the display initiates the privacy mode.

7. The information handling system of claim 2 wherein the timing controller adjusts brightness in the privacy mode by a predetermined number of nits.

8. The information handling system of claim 7 wherein the predetermined number of nits is a range of 20 to 30 nits.

9. A method for providing a privacy mode at an information handling system display, the method comprising:
   setting display brightness with brightness setting communicated from the information handling system to the display;
   receiving the brightness setting commands at a timing controller of the display;
   modifying the brightness setting commands with a processing resource of the display when a privacy mode is commanded for the display, the brightness setting commands modified with a microcontroller interfaced with the timing controller; and communicating the modified brightness setting commands to a backlight driver integrated circuit.

10. A method for providing a privacy mode at an information handling system display, the method comprising:

setting display brightness with brightness setting communicated from the information handling system to the display;

receiving the brightness setting commands at a timing controller of the display;

modifying the brightness setting commands with a processing resource of the display when a privacy mode is commanded for the display, :modifying the brightness setting commands modified with the timing controller; and communicating the modified brightness setting commands to a backlight driver integrated circuit.

11. The method of claim 10 further comprising:

detecting plural individuals in a field of view of the display; and in response to the detecting plural individuals, commanding the privacy mode to the timing controller.

12. The method of claim 11 wherein the detecting comprises detecting the plural individuals with a user presence detection sensor included in the display.

13. The method of claim 11 wherein the detecting comprises detecting the plural individuals with a user presence detection sensor included in the information handling system.

14. The method of claim 9 wherein the modifying the brightness setting commands with a processing resource of the display when a privacy mode is commanded for the display further comprises modifying the brightness setting commands to achieve a predetermined number of nits of reduced brightness.

15. The method of claim 14 wherein the predetermined number of nits of reduced brightness comprises a range of 5 to 100 nits.

16. A display comprising:

a housing;

a display panel coupled to the housing and operable to present visual images;

a timing controller interfaced with the display panel and operable to scan the visual images to the display panel;

a backlight operable to illuminate the visual images;

a processing resource interfaced with the timing controller and the backlight, the processing resource operable to execute instructions to process information; and a non-transitory memory interfaced with the processing resource and storing instructions that when executed on the processing resource cause:

monitoring of a pulse width modulation signal received at the timing controller, the pulse width modulation signal commanding brightness of illumination by the backlight;

detecting a privacy mode command; and in response to the privacy mode command, modifying the pulse width modulation signal to reduce brightness of illumination by the backlight by a predetermined amount;

wherein the processing resource comprises a microcontroller unit disposed between the timing controller and the backlight.

17. The display of claim 16 wherein the processing resource is included in the timing controller.

* * * * *